(12) United States Patent
Hu et al.

(10) Patent No.: US 9,944,288 B1
(45) Date of Patent: Apr. 17, 2018

(54) VEHICLE IDLE AND LAUNCH CONTROL

(71) Applicant: Ford Global Technologies, LLC, Dearborn, MI (US)

(72) Inventors: Guopeng Hu, Northville, MI (US); Zhengyu Dai, Canton, MI (US); Christoph Henel, Mettman (DE); Sathish Atluri, Novi, MI (US); Yang Xu, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/469,991

(22) Filed: Mar. 27, 2017

(51) Int. Cl.
*B60W 10/11* (2012.01)
*B60W 10/184* (2012.01)
*B60W 30/18* (2012.01)
*B60T 7/12* (2006.01)
*B60W 10/02* (2006.01)

(52) U.S. Cl.
CPC ....... *B60W 30/18118* (2013.01); *B60T 7/122* (2013.01); *B60W 10/02* (2013.01); *B60W 10/11* (2013.01); *B60W 10/184* (2013.01); *B60T 2201/06* (2013.01); *B60T 2260/09* (2013.01); *B60W 2510/0275* (2013.01); *B60W 2520/04* (2013.01); *B60W 2540/12* (2013.01); *B60W 2550/142* (2013.01); *B60W 2710/1005* (2013.01); *B60W 2710/18* (2013.01)

(58) Field of Classification Search
CPC .... B60W 10/02; B60W 10/11; B60W 10/184; B60W 30/18118; B60T 7/122; B60T 2201/06
See application file for complete search history.

(56) References Cited

U.S. PATENT DOCUMENTS

| | | | |
|---|---|---|---|
| 6,039,673 A * | 3/2000 | Mikami | F16H 61/0206 477/93 |
| 6,411,881 B1 | 6/2002 | Thomas | |
| 6,542,804 B2 | 4/2003 | Muratomi | |
| 7,509,202 B2 | 3/2009 | Scelers | |
| 8,090,499 B2 | 1/2012 | Tamai | |
| 9,302,666 B2 | 4/2016 | Rindfleish et al. | |
| 2005/0211478 A1* | 9/2005 | Sakuma | B60L 7/003 180/65.1 |
| 2012/0203433 A1* | 8/2012 | Higa | B60T 7/042 701/50 |

* cited by examiner

*Primary Examiner* — Edwin A Young
(74) *Attorney, Agent, or Firm* — James Dottavio; Brooks Kushman P.C.

(57) ABSTRACT

A transmission controller implements a neutral idle feature to reduce fuel consumption. A brake controller implements a Hill Start Assist feature to prevent roll-back when a vehicle is launching on an uphill grade. The transmission controller and the brake controller communicate to implement these features in a synergistic manner. Within certain road grade ranges, the transmission requests Hill Start Assist before activating neutral idle and does not activate neutral idle until it receives confirmation that Hill Start Assist is active. The transmission controller provides a powertrain torque estimate to the brake controller which the brake controller uses to determine when to release the brakes during an assisted start.

13 Claims, 3 Drawing Sheets

VEHICLE IDLE AND LAUNCH CONTROL

TECHNICAL FIELD

This disclosure relates to the field of vehicle controls. More particularly, the disclosure pertains to brake and transmission control systems that communicate to implement a neutral idle feature and a hill start assist feature.

BACKGROUND

A common type of vehicular powertrain includes a transmission with a torque converter and a gearbox. Traditionally, the gearbox remains engaged when the vehicle comes to a stop in Drive mode, such as when stopping for a traffic light. In this condition, the transmission continues to exert some load on the engine and to transmit some torque, called creep torque, to the vehicle wheels. When the driver releases the brake pedal but doesn't immediately depress the accelerator pedal, this creep torque keeps the vehicle from rolling backwards even on moderate uphill grades.

The load on the engine increases fuel consumption while the vehicle is idling in drive. One approach to reduce fuel consumption while the vehicle is stationary is to automatically release a transmission clutch to put the gearbox into a neutral state. The clutch is automatically re-engaged when the brake pedal is released. This reduces the load on the engine during idle, but also eliminates the creep torque during the interval between brake pedal release and re-engagement of the clutch. If the vehicle is stopped on an uphill grade, the vehicle may roll backwards at first, which is disconcerting to the driver.

SUMMARY OF THE DISCLOSURE

A vehicle includes a braking system and a transmission. The braking system responds to a Hill Start Assist (HSA) request by maintaining wheel brake torque to hold the vehicle on a grade until an estimated powertrain torque is sufficient to prevent roll back. The transmission responds to brake pedal application with the vehicle stationary by requesting HSA and responds to confirmation of activation of HSA by releasing a clutch to enter a neutral idle mode. The transmission may include a torque converter with an impeller and a turbine and a gearbox. The gearbox selectively establishes each of a plurality of power flow paths by engaging subsets of a plurality of clutches. The braking system and the transmission may each have controllers which communicate with one another. They may communicate with one another, for example, using a controller area network.

A vehicle control system includes a brake controller and a transmission controller. The brake controller responds to an HAS request by maintaining wheel brake torque to hold a vehicle on a grade and sending an HSA confirmation. The brake controller may release wheel brake torque in response to an estimated powertrain torque exceeding a torque required to hold the vehicle on a present grade. The transmission controller responds to brake pedal application with the vehicle stationary by sending the HSA request and responds to receiving the HSA confirmation by releasing a clutch to enter a Neutral Idle mode. The transmission controller may communicate the estimated torque to the brake controller. The torque may be estimated based on a torque capacity of the clutch or based on measured speeds of a torque converter impeller and torque converter turbine.

A transmission includes a torque converter, a gearbox, and a controller. The gearbox selectively establishes a power flow path from the torque converter to an output shaft. The controller responds to brake pedal application with the output shaft stationary by i) sending an HSA request to a braking system, and ii) after receiving confirmation of HSA activation, releasing a clutch to disengage the power flow path. The transmission may also calculate an estimated powertrain torque and communicate the estimate to the brake controller. The powertrain torque estimate may be based on i) a torque capacity of the clutch and/or ii) measured speeds of a torque converter impeller and a torque converter turbine.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
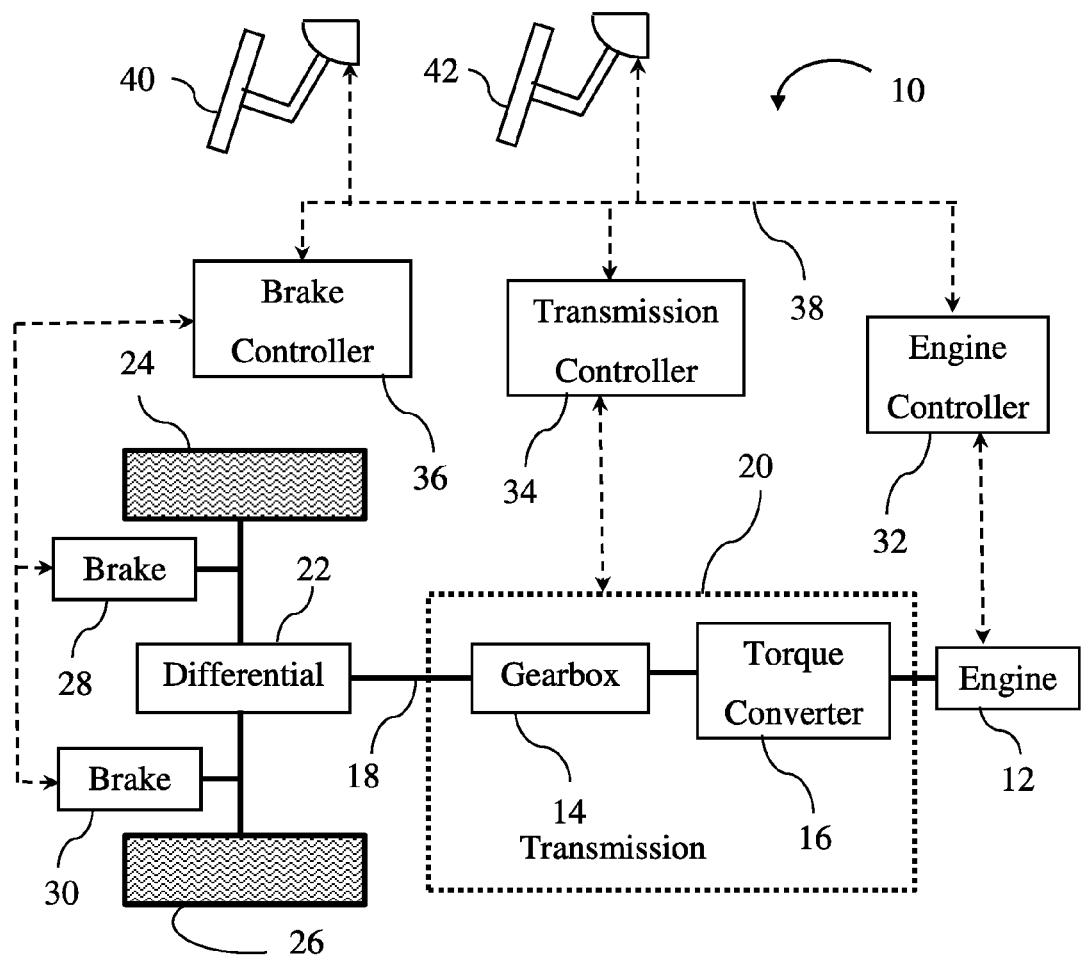
FIG. 1 is a schematic representation of a vehicle powertrain and brake system.

A vehicle 10 is illustrated schematically in FIG. 1. Bold solid lines represent the flow of mechanical power. Dashed lines indicate the flow of control signals. Power to propel the vehicle is provided by internal combustion engine 12. The power is transmitted to gearbox 14 by torque converter 16. Torque converter 16 transfers power hydro-dynamically from an impeller fixed to the engine crankshaft to a turbine. The turbine torque is a function of the speed of the impeller and the speed of the turbine. Power is transferred from the impeller to the turbine only when the impeller rotates faster than the turbine. When the ratio of impeller speed to turbine speed is high enough, the turbine torque is a multiple of the impeller torque. Gearbox 14 transmits power from torque converter to output shaft 18 by engaging clutches to establishing a power flow path. The term clutch, in this context, includes shift elements within the gearbox that selectively hold an element against rotation as well as shift elements that selectively couple two rotatable elements to one another. Different power flow paths are established by engaging different combinations of clutches. At low vehicle speeds, a power flow path is established that multiplies the turbine torque. At high vehicle speeds, the gearbox may use an overdrive power flow path that increases speed and decreases torque. Torque converter 16, gearbox 14, and associated controls collectively form transmission 20.

Differential 22 further multiplies the torque by a fixed ratio and changes the axis of rotation by 90 degrees. Differential 22 transmits approximately equal torques to left and right wheels 24 and 26 while accommodating slight speed differences between the wheels as the vehicle turns. Wheels 24 and 26 convert the torque into a tractive force against the road surface. Although FIG. 1 illustrated a longitudinal powertrain, the powertrain may also be mounted transversely, in which case the axis of rotation of the engine and transmission is parallel to, but offset from, the wheel axis.

Brakes 28 and 30 are associated with drive wheels 24 and 26 respectively. Upon command, the brakes exert torque on the wheels tending to slow the wheels down. Although not shown in FIG. 1, the vehicle also includes front wheels with associated brakes. The front wheels may be undriven or may be driven via additional powertrain hardware such as a transfer case and front differential.

In the embodiment of FIG. 1, engine 12, transmission 20, and brake system are controlled by controllers 32, 34, and 36 respectively. Engine controller 32 sends signals to engine 12 to control the amount of power produced. These signals may impact, for example, the fuel flow, the throttle opening, and spark timing. Controller 32 also receives signals from engine 12 such as crankshaft speed. Transmission controller 34 sends signals to transmission 20 to control the state of engagement or release of various clutches within gearbox 14. For example, the controller may adjust electrical currents to solenoids within a valve body such that the torque capacity of clutches is a function of electrical current. Controller 34 receives signals from transmission 20 such as turbine speed and output shaft speed. Brake controller 36 controls the resistive torque applied by brakes 28 and 30, as well as the front brakes. FIG. 1 illustrates a full brake-by-wire system in which the controller directly adjusts brake torque. Some embodiments may include mechanical or hydraulic actuation based directly on brake pedal 40 with brake controller 36 having limited authority. For example, brake controller 36 may have authority to maintain brake torque after the driver releases pedal 40 but not have authority to apply the brakes in the absence of a driver command via pedal 40.

Controllers 32, 34, and 36 communicate with each other via Controller Area Network 38. The controllers also receive signals from driver operated devices such as brake pedal 40 and accelerator pedal 42 and send signals to devices such as display units. Some of these signals may be conveyed via CAN 38 while others are conveyed by other mechanisms such as dedicated wires. In an autonomous vehicle, brake pedal 40 and accelerator pedal 42 may be virtual pedals as opposed to physical pedals.

Figure 2:
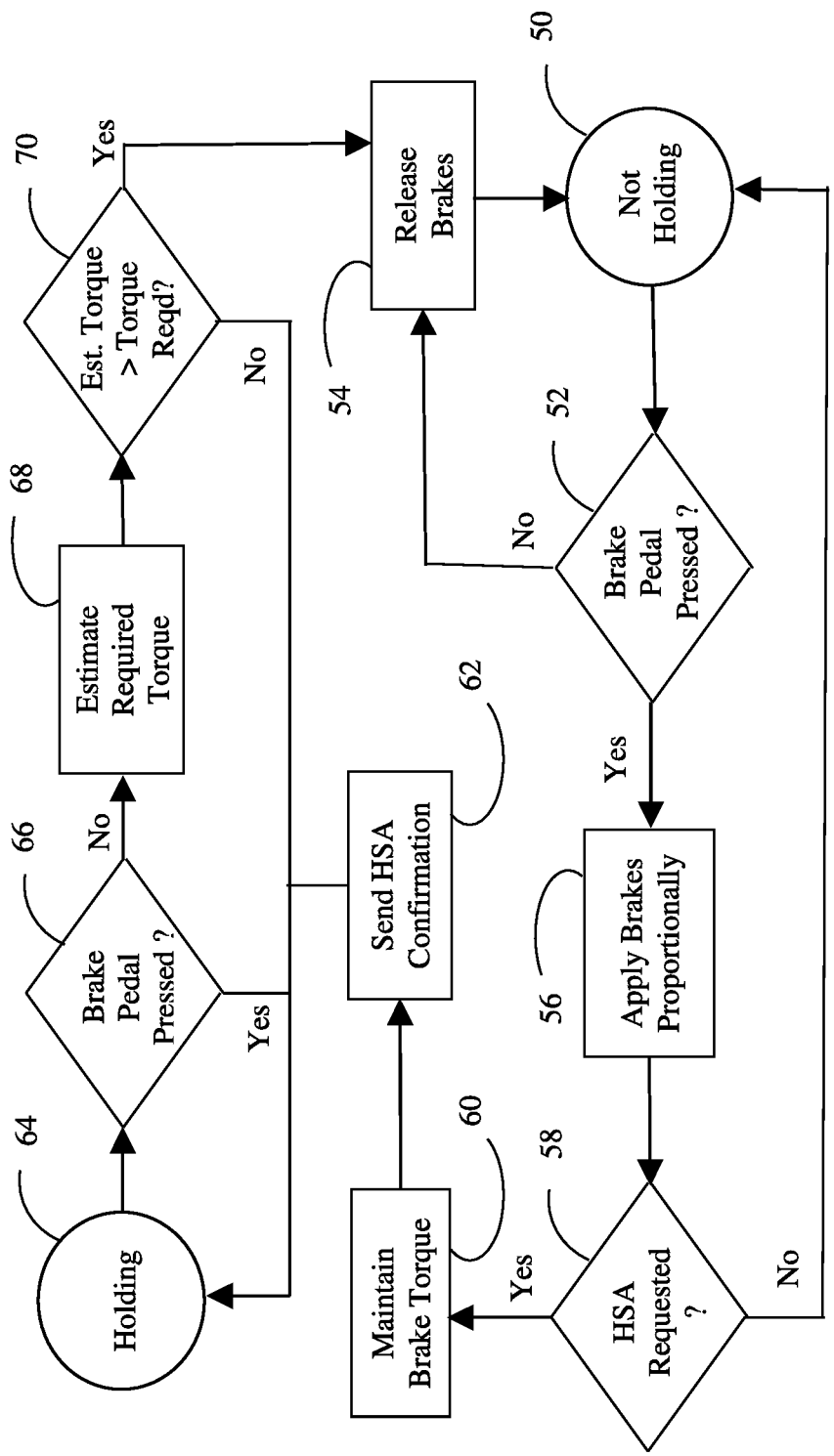
FIG. 2 is a flow chart for a Hill Start Assist (HSA) feature of a braking system.

FIG. 2 is a flow chart indicating some of the functions performed by the brake controller. In particular, FIG. 2 illustrates the operations associated with providing a Hill Start Assist (HSA) feature. The controller executes the routine at regular intervals, such as in response to interrupts. The starting point in the routine depends upon a current state, which can be either Holding or Not Holding. When an arrow leads into a state, illustrated by a circle in the flow chart, execution stops and then resumes from that point in response to the next interrupt.

If the feature is in a Not Holding state, the routine starts at 50. At 52, the controller checks whether the brake pedal is currently pressed. If not, then the controller releases the brakes (if they were previously engaged) at 54 and remains in the Not Holding state. If the brake pedal is pressed at 52, the controller applies brake torque in proportion to the degree of pedal application at 56. (In a limited authority system, it may not be the brake controller that accomplishes this.) Then, at 58, the controller checks whether an HSA request has been received. If not, the controller remains in Not Holding state. If a request has been received at 58, the controller records the current brake pressure and maintains at least that amount of brake torque at 60, sends a confirmation at 62, and transitions into Holding state. For simplicity, FIG. 2 omits aspects of the Hill Start Assist feature that may be applicable when the feature is activated for reasons other than a request from another controller. Similarly, it omits aspects that may be necessary for coordination with other brake control features such as Anti-lock Braking.

If the feature is in a Holding state, the routine starts at 64. At 66, the controller checks whether the brake pedal is currently pressed. If so, the controller remains in Holding state and leaves the brakes fully engaged. If the brake pedal is not pressed at 66, the controller estimates the brake torque required to hold the vehicle on the current grade at 68. To accomplish this, the controller may utilize estimates of the current road grade, and the current vehicle weight. These estimates may be obtained from other controllers or calculated using, for example, the methods described in U.S. Patent Application Publication 2015/0258994. At 70, the torque computed at 68 is compared to an estimate of torque from the powertrain. The powertrain torque estimate may also be based on information from other controllers as discussed below. For example, the estimated torque may be calculated by multiplying an estimated transmission output shaft torque by a final drive ratio. If the estimated powertrain torque is not sufficient to prevent the vehicle from rolling downhill, then the controller stays in the Holding state with the brakes fully engaged, even though the brake pedal has been released. If the estimated powertrain torque is sufficient at 70, then the controller releases the brakes at 54 and transitions to the Not Holding state.

Figure 3:
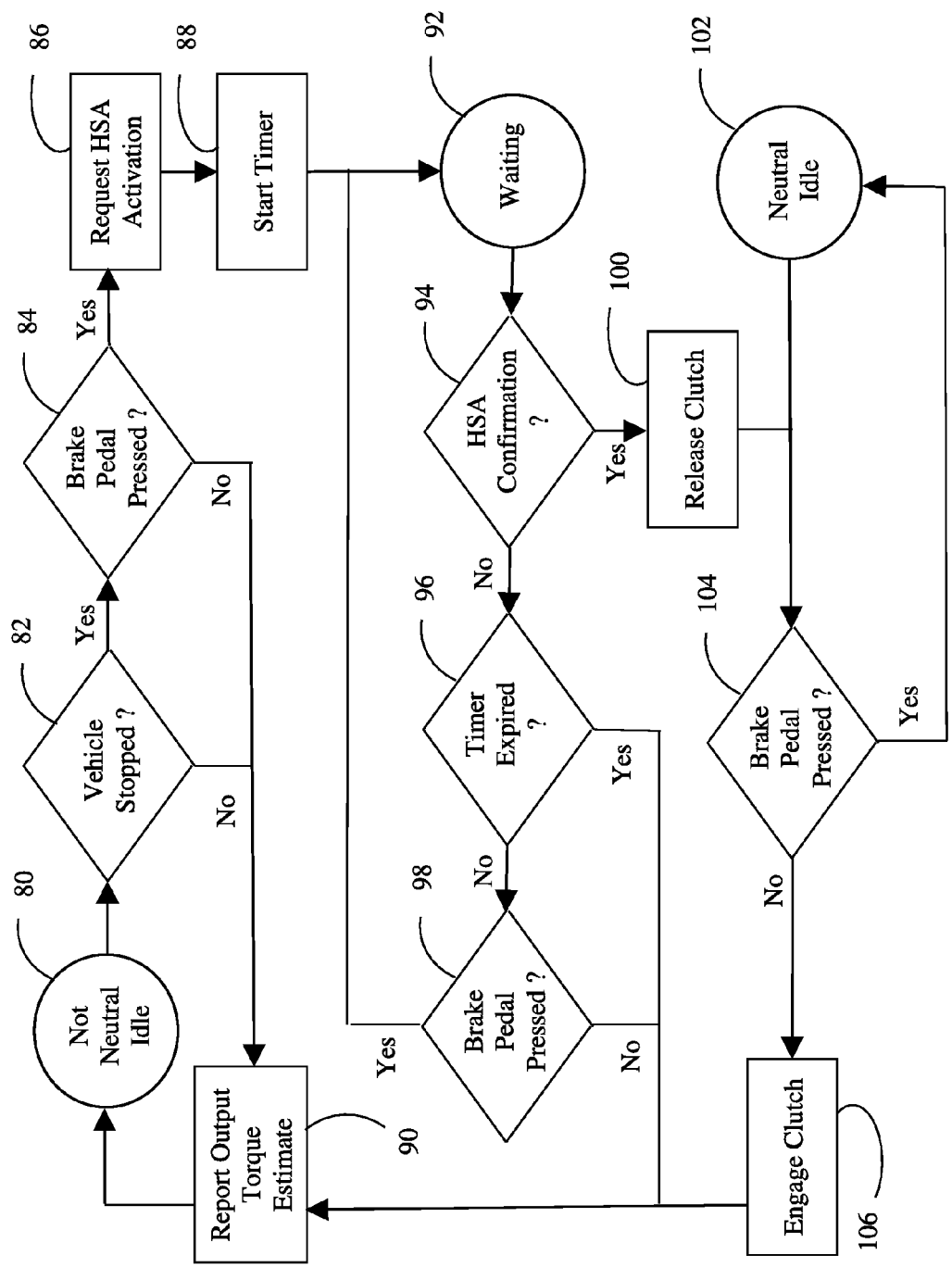
FIG. 3 is a flow chart for a Neutral Idle feature of a transmission control system.

FIG. 3 illustrates the operations performed by transmission controller 34 associated with providing a Neutral Idle (NI) feature. The controller executes the routine at regular intervals, such as in response to interrupts. The starting point in the routine depends upon a current state which can be either Neutral Idle, Not Neutral Idle, or Waiting.

If the feature is in a Not Neutral Idle state, processing starts at 80. At 82 and 84, the controller checks whether the vehicle is stopped and the brake pedal is pressed. The transmission controller can determine whether the vehicle is stopped by whether the transmission output shaft speed is approximately zero. If the vehicle is stopped with the brakes applied, the controller begins the process of transitioning into the neutral idle state, but does not transition right away. At 86, the transmission controller requests activation of the HSA feature. At 88 the controller starts a timer and then transitions into the Waiting state. If the vehicle is moving, or the brakes are not applied, the controller updates a powertrain torque estimate at 90. If the transmission has fully established a power flow path, then the output torque is estimated by multiplying the gearbox input torque by the torque ratio associated with the power flow path. When the torque converter bypass clutch is disengaged, the gearbox input torque can be estimated based on the speeds of the impeller and the turbine. When the torque converter bypass clutch is engaged, the gearbox input torque can be estimated based on an estimated engine torque provided by the engine controller. When the transmission is in the process of establishing a power flow path, such as during a shift or engagement from neutral, one of the clutches that establishes the power flow path may be slipping. In such condition, the transmission output torque can be estimated based on the torque capacity of the slipping clutch and a predetermined ratio associated with power flow path and clutch. The controller estimates the torque capacity of the clutch based on the current that it is commanding. Methods for estimating output shaft torque are described in more detail in U.S. Patent Application Publication 2015/0258994.

If the feature is in a Waiting state, processing starts at 92. At 94, the transmission controller checks whether a confirmation of Hill Start Assist activation has been received from the brake controller. If a confirmation has not been received, the transmission controller checks at 96 whether the timer that was started at 88 has expired. If the timer has expired, then the controller reports an output torque estimate at 90 and transitions to the Not Neutral Idle state. In some embodiments, the controller may set a flag indicating that a time-out has occurred. In such embodiments, the flag would be checked before step 86 to prevent repeated attempts during a stop event. The flag would be reset when the vehicle speed exceeds a threshold, indicating that the next stop should be treated as a new stop event. If the timer has not yet expired, the controller checks at 98 whether the brake pedal is still pressed. If the brake pedal is still pressed, the controller remains in the Waiting state until the next time the routine is called. If the brake pedal has been released, then the controller reports an output torque estimate at 90 and transitions to the Not Neutral Idle state.

If an HSA confirmation has been received at 94, the controller commands release of a transmission clutch at 100 to enter a neutral gear state, in which no power flows from the torque converter to the output shaft. There may be some time lag between commanding release of the clutch and the clutch torque capacity decreasing to near zero. Upon commanding release of the clutch at 100, or when the routine is called while the feature is in a Neutral Idle state, the controller checks the status of the brake pedal at 104 to determine if the transmission should stay in neutral or prepare for a vehicle launch. If the brake pedal is still pressed at 104, the controller stays in the Neutral Idle state with the clutch released. If the brake pedal has been released at 104, the controller commands engagement of the clutch at 106. The clutch may be engaged in a controlled manner, typically over a period of a few hundred milliseconds. After commanding the engagement process to begin at 106, the controller reports the output torque at 90 and transitions to the Not Neutral Idle state.

Some embodiments may use HSA only when the grade is in a particular range. In these embodiment, In these embodiment, the transmission controller would check the current grade between steps 84 and 86. (For this purpose, uphill grades are positive and downhill grades are negative.) If the current grade is less than a minimum threshold, the controller would proceed directly to step 100 to immediately start releasing a clutch to transition into neutral idle mode. At sufficiently slight uphill grades or on downhill grades, roll-back is not a concern. If the current grade is greater than a maximum threshold, the controller returns to 80 and remains in Not Neutral Idle mode. Disabling neutral idle on steep grades has little impact on average fuel economy because it impacts a relatively small percentage of idle time, on average.

During a typical stop at a traffic light on an uphill grade, the transmission would be in neutral for most of the duration of the stop, reducing fuel consumption. When the driver releases the brake pedal after the light turns green, the brake system will prevent roll-back until the powertrain is transmitting enough torque to propel the vehicle forward.

As the vehicle brakes to a stop at the light, the neutral idle feature will be in the Not Neutral Idle state and the Hill Start Assist feature will be in the Not Holding state. The transmission controller will cycle among steps 80, 82, and 84 each time it is called, maintaining the power flow path dictated by the usual gear ratio scheduling procedure. The brake controller will cycle among steps 50, 52, 56, and 58, applying the brakes in proportion to the driver's command.

Once the vehicle comes to a stop, the transmission controller will request HSA Activation at 86 and transition to the Waiting state. The brake controller will notice this request at 58 and respond by fully engaging the brakes at 60, sending a confirmation at 62, and entering the Holding state. The transmission controller will notice the confirmation at 94 and respond by releasing a transmission clutch. Upon releasing the clutch, the torque converter turbine, which had been stationary, will accelerate to almost the same speed as the torque converter impeller. Once, the impeller and turbine are at the same speed, the torque transmitted is negligible, reducing the load on the engine. At the lower load, the engine consumes less fuel. While the vehicle remains stopped with the brake pedal applied, the transmission controller cycles among steps 102 and 104, remaining in the Neutral Idle state. The brake controller cycles among steps 64 and 66, remaining in the Holding state.

When the driver releases the brake pedal to initiate forward motion, the transmission controller will command engagement of the clutch at 106. Then, as the clutch builds torque capacity, the transmission controller cycles among steps 80, 82, 84, and 90. During each cycle, it reports the estimated output torque to the brake controller. As the clutch torque capacity is building up, the brake controller cycles among steps 64, 66, 68, and 70. The gradual engagement of the clutch will also slow the torque converter turbine, increasing the load on the engine. At some point, the brake controller will determine at 70 that the driveline torque has increased sufficiently to prevent roll-back. At that point, the brake controller releases the brakes at 54 and transitions to Not Holding state. The vehicle then begins to move forward.

Suppose that a communications failure caused the brake controller not to receive the HSA request. Then, the brake controller wouldn't send a confirmation. The transmission controller would not shift into neutral. Instead, it would remain in the Waiting state until either the timer expired or the brake pedal was released. The vehicle would not roll back when the brake pedal is released because the powertrain would continue to develop considerable creep torque. If the timer expires, the transmission controller would send a new HSA request. In some embodiments, the controller may keep track of how many requests are sent and set a flag to stop sending them at some point.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A vehicle comprising:
   a braking system configured to respond to a Hill Start Assist (HSA) request by maintaining wheel brake torque to hold the vehicle on a grade until an estimated powertrain torque is sufficient to prevent roll back; and
   a transmission configured to respond to brake pedal application with the vehicle stationary by requesting HSA and to respond to confirmation of activation of HSA by releasing a clutch to enter a neutral idle mode.

2. The vehicle of claim 1 wherein the transmission comprises:
   a torque converter having an impeller and a turbine; and
   a gearbox configured to selectively establish each of a plurality of power flow paths by engaging subsets of a plurality of clutches, the plurality of clutches including the clutch that is released to enter the neutral idle mode.

3. The vehicle of claim 1 wherein:
   the transmission comprises a transmission controller; and
   the brake system comprises a brake controller in communication with the transmission controller.

4. The vehicle of claim 3 further comprising a controller area network providing communication between the brake controller and the transmission controller.

5. A vehicle control system comprising:
   a brake controller programmed to respond to a Hill Start Assist (HSA) request by maintaining wheel brake torque to hold a vehicle on a grade and sending an HSA confirmation; and
   a transmission controller programmed to respond to brake pedal application with the vehicle stationary by sending the HSA request and to respond to receiving the HSA confirmation by releasing a clutch to enter a Neutral Idle mode.

6. The vehicle control system of claim 5 wherein the brake controller is programmed to release wheel brake torque in response to an estimated powertrain torque exceeding a torque required to hold the vehicle on a present grade.

7. The vehicle control system of claim 6 wherein the estimated powertrain torque is communicated to the brake controller by the transmission controller.

8. The vehicle control system of claim 7 wherein the estimated powertrain torque is proportional to a torque capacity of the clutch.

9. The vehicle control system of claim 7 wherein the estimated powertrain torque is based on measured speeds of a torque converter impeller and a torque converter turbine.

10. A transmission comprising:
    a torque converter;
    a gearbox configured to selectively establish a power flow path from the torque converter to an output shaft; and
    a controller programmed to respond to brake pedal application with the output shaft stationary by
      sending a Hill Start Assist (HSA) request to a braking system, and
      after receiving confirmation that the braking system will maintain wheel brake torque to hold a vehicle on a grade, releasing a clutch to disengage the power flow path.

11. The transmission of claim 10 wherein the controller is further programmed to send an estimated powertrain torque to a brake controller.

12. The transmission of claim 11 wherein the controller is further programmed to calculate the estimated powertrain torque based on a torque capacity of the clutch.

13. The transmission of claim 11 wherein the controller is further programmed to calculate the estimated powertrain torque based on measured speeds of a torque converter impeller and a torque converter turbine.

* * * * *